US012724289B2

(12) United States Patent
Fang et al.

(10) Patent No.: US 12,724,289 B2
(45) Date of Patent: Sep. 1, 2026

(54) STEREO PROJECTION SCREEN AND STEREO PROJECTION SYSTEM

(71) Applicant: Coretronic Corporation, Hsin-Chu (TW)

(72) Inventors: Chung-Yang Fang, Hsin-Chu (TW); Wen-Chun Wang, Hsin-Chu (TW); Bo-Han Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 282 days.

(21) Appl. No.: 18/491,807

(22) Filed: Oct. 23, 2023

(65) Prior Publication Data

US 2024/0142794 A1 May 2, 2024

(30) Foreign Application Priority Data

Oct. 26, 2022 (CN) ........................ 202211316107.8

(51) Int. Cl.
*G02B 30/25* (2020.01)
*G03B 21/60* (2014.01)

(52) U.S. Cl.
CPC ............. *G02B 30/25* (2020.01); *G03B 21/60* (2013.01)

(58) Field of Classification Search
CPC .................. G03B 21/56–625; G02B 30/25–33
USPC ................................................ 359/443–461
See application file for complete search history.

(56) References Cited

U.S. PATENT DOCUMENTS

2011/0317129 A1* 12/2011 Hsu ........................ H04N 13/31 353/8
2012/0033184 A1* 2/2012 Tanaka ................ H04N 13/337 359/465
2015/0370156 A1* 12/2015 Kim ......................... G02B 1/14 359/458

FOREIGN PATENT DOCUMENTS

CN 110927855 3/2020
TW 201200912 1/2012
WO WO-2013063235 A1 * 5/2013 ............. G02B 30/25

* cited by examiner

*Primary Examiner* — Jessica M Merlin
(74) *Attorney, Agent, or Firm* — JCIPRNET

(57) ABSTRACT

A stereo projection screen including a scattering screen having a scattering structure layer, a phase retardation layer disposed between the scattering structure layer and the polarized projector, and a metal reflection layer covering at least a part of the scattering structure layer is provided. The scattering structure layer and the phase retardation layer are arranged in a first display area and a second display area of the stereo projection screen. The metal reflection layer is arranged in at least one of the first display area and the second display area. A first image light beam having a first polarization state has a second polarization state after being transmitted to the first display area and leaving the stereo projection screen. A second image light beam having the first polarization state still has the first polarization state after being transmitted to the second display area and leaving the stereo projection screen.

15 Claims, 11 Drawing Sheets

LEYE(USR)

10

310(300)

100

PX1(IM1)

ILB1a(P1)

ILB1a(P2)

PX2(IM2)

ILB2b(P1)

ILB2b(P1)

250

250P2

250P1

200

240

230

215(210)

DA2 DA1 DA2 DA1

REYE(USR)

10

320(300)

100

PX1(IM1)

ILB1b(P1)

ILB1b(P2)

PX2(IM2)

ILB2a(P1)

ILB2a(P1)

250

250P2

250P1

200

240

230

215(210)

DA2

DA1

DA2

DA1

10A

DA1 DA2 DA1 DA2
215(210) 230A 240 250A
220
200A
ILB1b(P2)
ILB2b(P1)
ILB1b(P1)
PX2(IM2)
PX1(IM1)
320(300)
310(300)
REYE LEYE USR
100

10B

215(210)
230A
240
250A
DA1
DA2
DA1
DA2
220
320(300)
310(300)
ILB2a(P1)
ILB1a(P2)
ILB2c(P1)
ILB1c(P2)
ILB1c(P1)
PX1(IM1)
PX2(IM2)
153
151
150
REYE
LEYE
USR
200A
100A

STEREO PROJECTION SCREEN AND STEREO PROJECTION SYSTEM

CROSS-REFERENCE TO RELATED APPLICATION

This application claims the priority benefit of China application serial no. 202211316107.8, filed on Oct. 26, 2022. The entirety of the above-mentioned patent application is hereby incorporated by reference herein and made a part of this specification.

BACKGROUND

Technical Field

The disclosure relates to a stereo projection technology, and in particular, to a stereo projection screen and a stereo projection system.

Description of Related Art

Stereo projection technology may be roughly divided into active shutter glasses technology and passive polarized glasses technology. No matter the kind of technology, it is necessary for the user to wear glasses to watch the left-eye image and the right-eye image projected on the projection screen respectively, and the received left-eye and right-eye images are combined in the brain to perceive the stereo vision. During use, whether it is the active shutter glasses (active shutter glasses technology) or the polarizing modulator mounted on the projector (passive polarizing glasses technology) needs to be synchronized with the projected images in order to allow the left eye and right eye to respectively see the images with parallax. If there is an error in the synchronization signal, the projected image will be seen by both eyes at the same time, causing crosstalk on the images and affecting the experience of the stereo vision. In addition, the projector used in the passive polarized glasses technology requires an external polarizing modulator, which causes inconvenience in use.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a stereo projection system, which may provide a more favorable stereo viewing experience and is easy to operate.

Other purposes and advantages of the disclosure may be further understood from the technical features disclosed in the disclosure.

In order to achieve one or part or all of the above purposes or other purposes, an embodiment of the disclosure provides a stereo projection system. The stereo projection system includes a polarized projector, a stereo projection screen, and polarizing glasses. The polarized projector is adapted to project a first image light beam and a second image light beam having a first polarization state. The stereo projection screen is disposed on a transmission path of the first image light beam and the second image light beam, and has a first display area and a second display area. The stereo projection screen includes a scattering screen, a phase retardation layer, and a metal reflection layer. The scattering screen has a scattering structure layer on a side of the scattering screen facing the polarized projector. The phase retardation layer is disposed between the scattering structure layer and the polarized projector. The metal reflection layer covers at least a part of the scattering structure layer and is adapted to reflect the first image light beam from the phase retardation layer back to the phase retardation layer. The first image light beam has a second polarization state after being transmitted to the first display area and leaving the stereo image screen. The second image light beam still has the first polarization state after being transmitted to the second display area and leaving the stereo image screen. The second polarization state is orthogonal to the first polarization state. The polarizing glasses have a left-eye lens and a right-eye lens. One of the left-eye lens and the right-eye lens is adapted to allow the first image light beam having the second polarization state to pass through and absorb the second image light beam having the first polarization state. The other of the left-eye lens and the right-eye lens is adapted to allow the second image light beam having the first polarization state to pass through and absorb the first image light beam having the second polarization state.

In order to achieve one or part or all of the above purposes or other purposes, an embodiment of the disclosure provides a stereo projection screen. The stereo projection screen has a first display area and a second display area, and includes a scattering screen, a phase retardation layer, and a metal reflection layer. The scattering screen has a scattering structure layer on a side of the scattering screen facing a polarized projector. The phase retardation layer is disposed between the scattering structure layer and the polarized projector. The metal reflection layer covers at least a part of the scattering structure layer. The scattering structure layer and the phase retardation layer are arranged in the first display area and the second display area. The metal reflection layer is arranged in at least one of the first display area and the second display area. A first image light beam having a first polarization state has a second polarization state after being transmitted to the first display area and leaving the stereo projection screen. A second image light beam having the first polarization state still has the first polarization state after being transmitted to the second display area and leaving the stereo projection screen. The second polarization state is orthogonal to the first polarization state.

Based on the above, in the stereo projection system according to an embodiment of the disclosure, the stereo projection screen has the scattering screen and the phase retardation layer, and at least part of the display area thereof further has the metal reflection layer. Through the configuration relationship between the metal reflection layer and the phase retardation layer, the polarization state of the first image light beam projected to a part of the display area changes after leaving the stereo projection screen and may only pass through one of the lenses of the polarizing glasses, while the polarization state of the second image light beam projected to the rest of the display area remains unchanged after leaving the stereo projection screen and may only pass through the other of the lenses of the polarizing glasses. Accordingly, when the polarization state of the image light beam projected by the polarized projector does not need to be synchronized with the image signals of the two eyes, the user may still generate the stereo vision and avoid the signal crosstalk problem caused by the current synchronization technology. In addition, during the operation of the stereo projection system, since the polarized projector does not require an external polarizing modulator to dynamically adjust the polarization state of the projected image light beam, the operational convenience of the stereo projection system may be increased.

Other objectives, features, and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
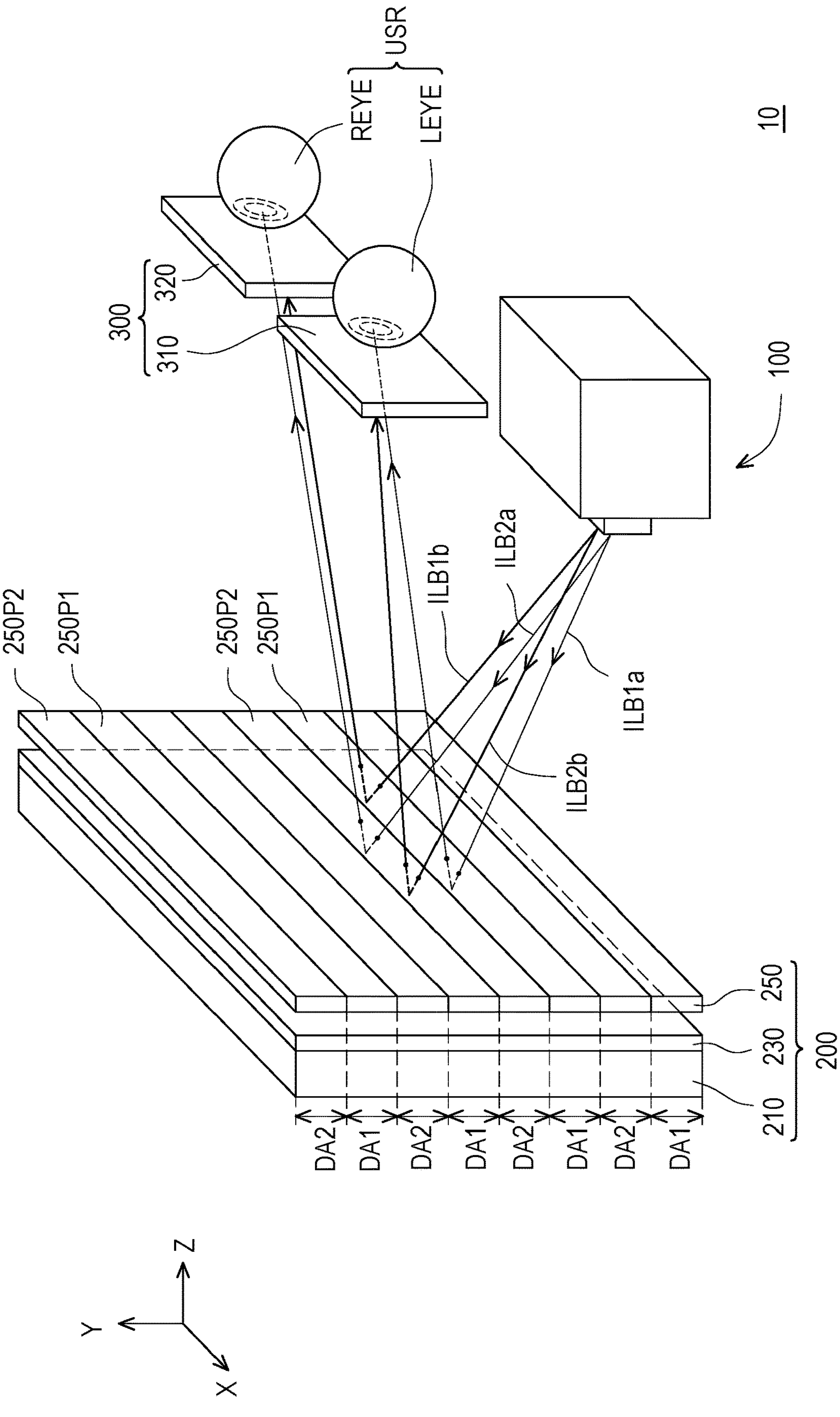
FIG. 1 is a schematic diagram of a stereo projection system according to a first embodiment of the disclosure.
Figure 2A:
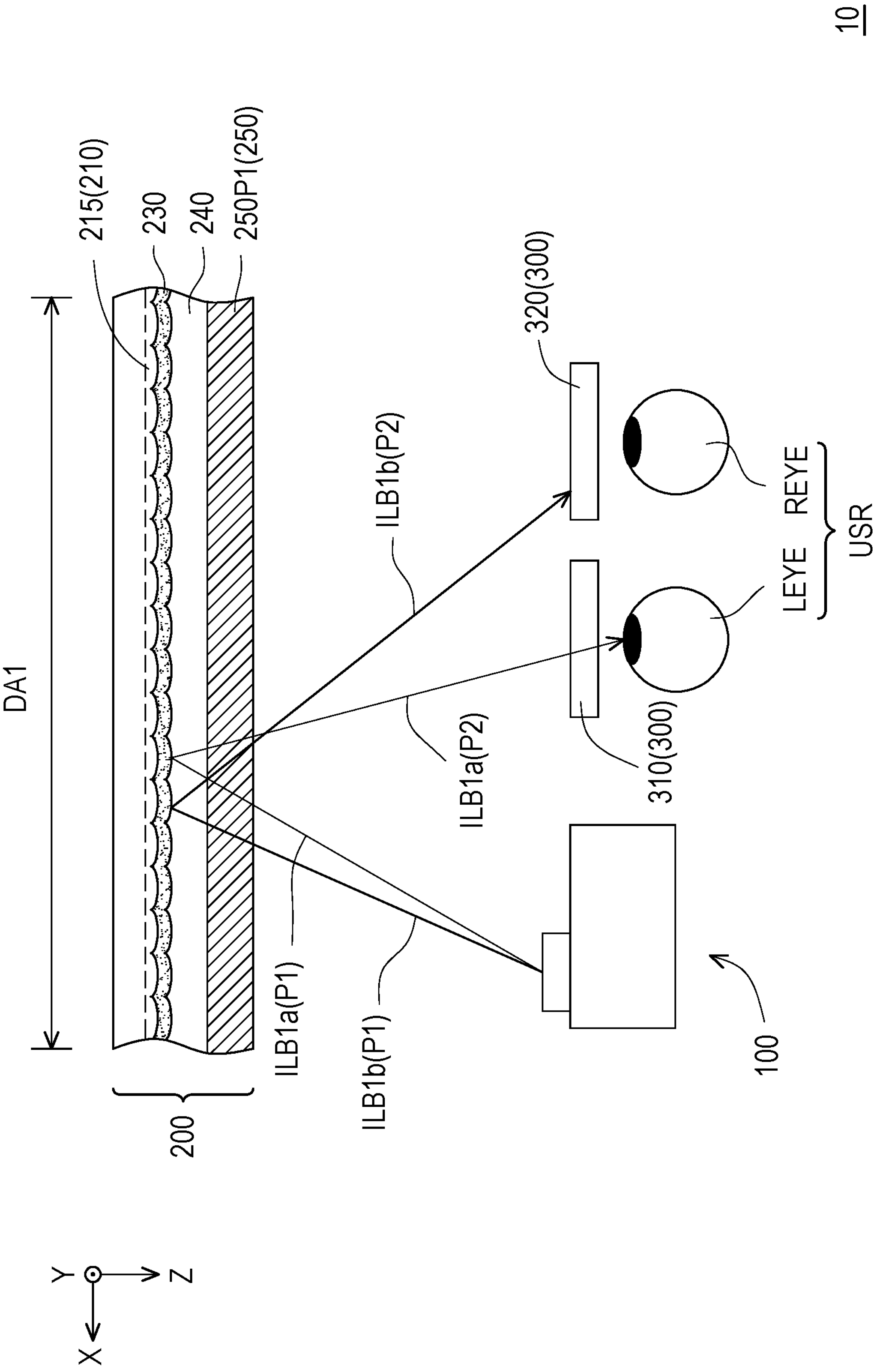
FIG. 2A and FIG. 2B are schematic top views of the stereo projection system shown in FIG. 1.
Figure 2B:
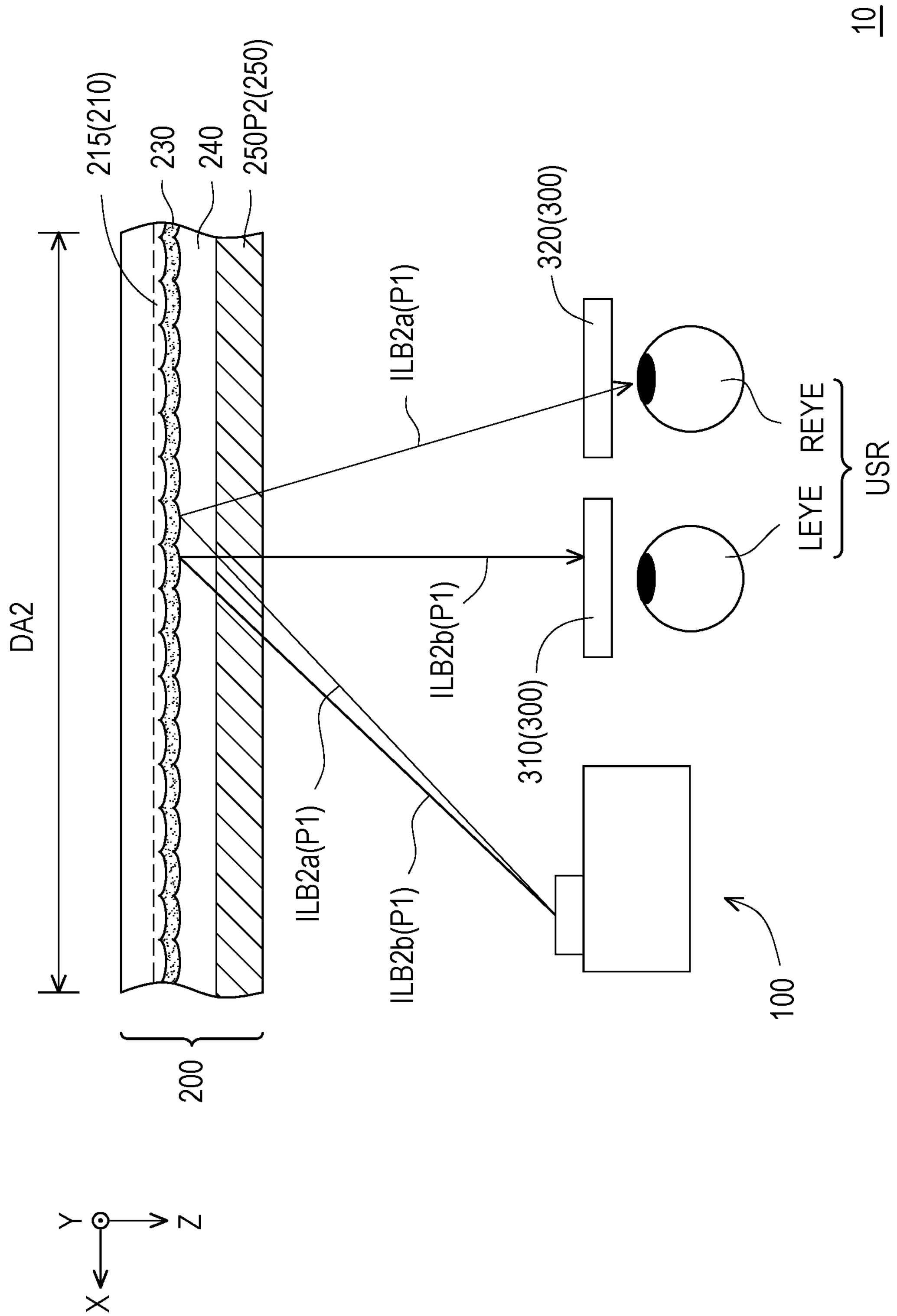
Figure 3A:
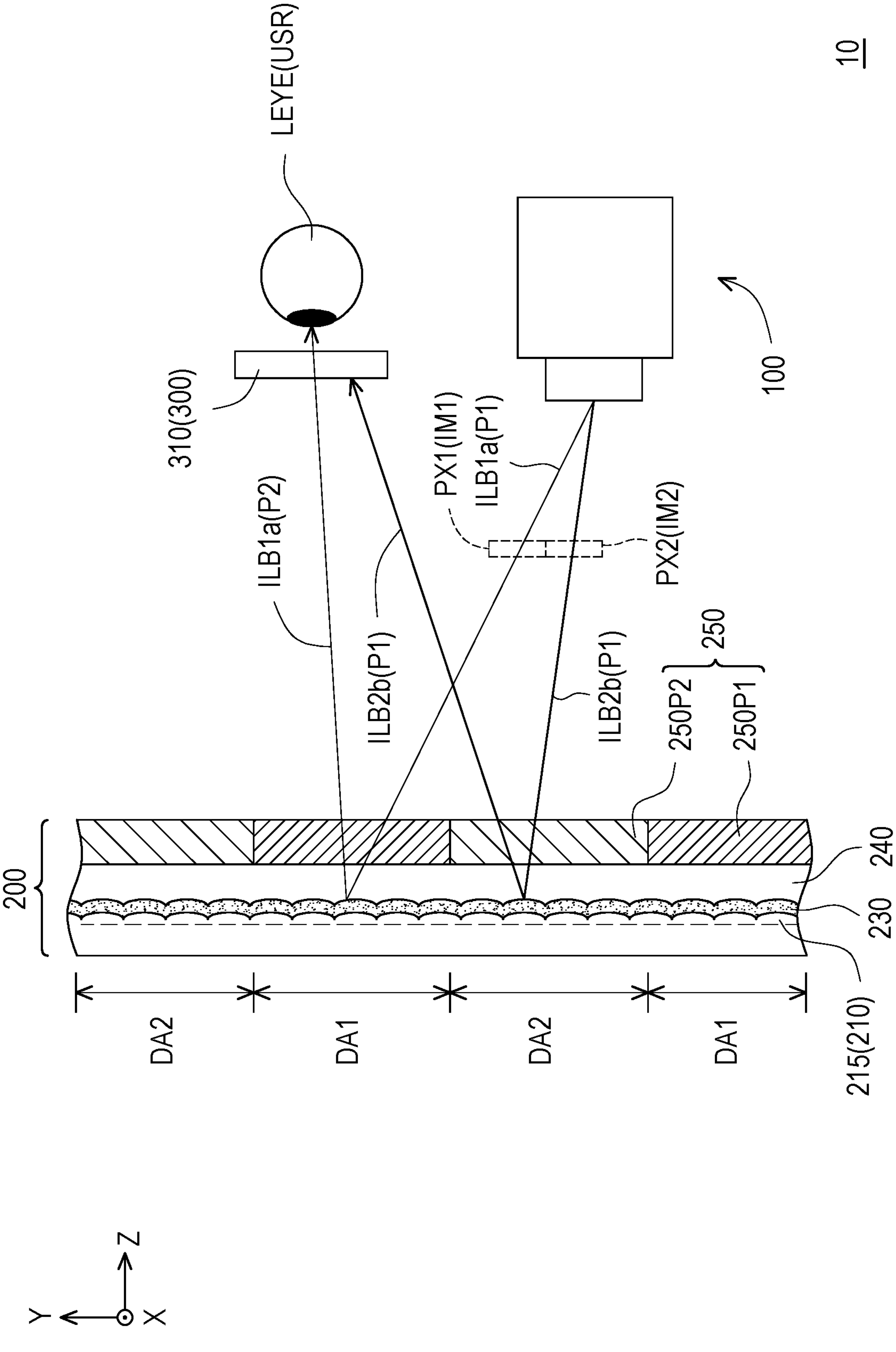
FIG. 3A and FIG. 3B are schematic side views of the stereo projection system shown in FIG. 1.
Figure 3B:
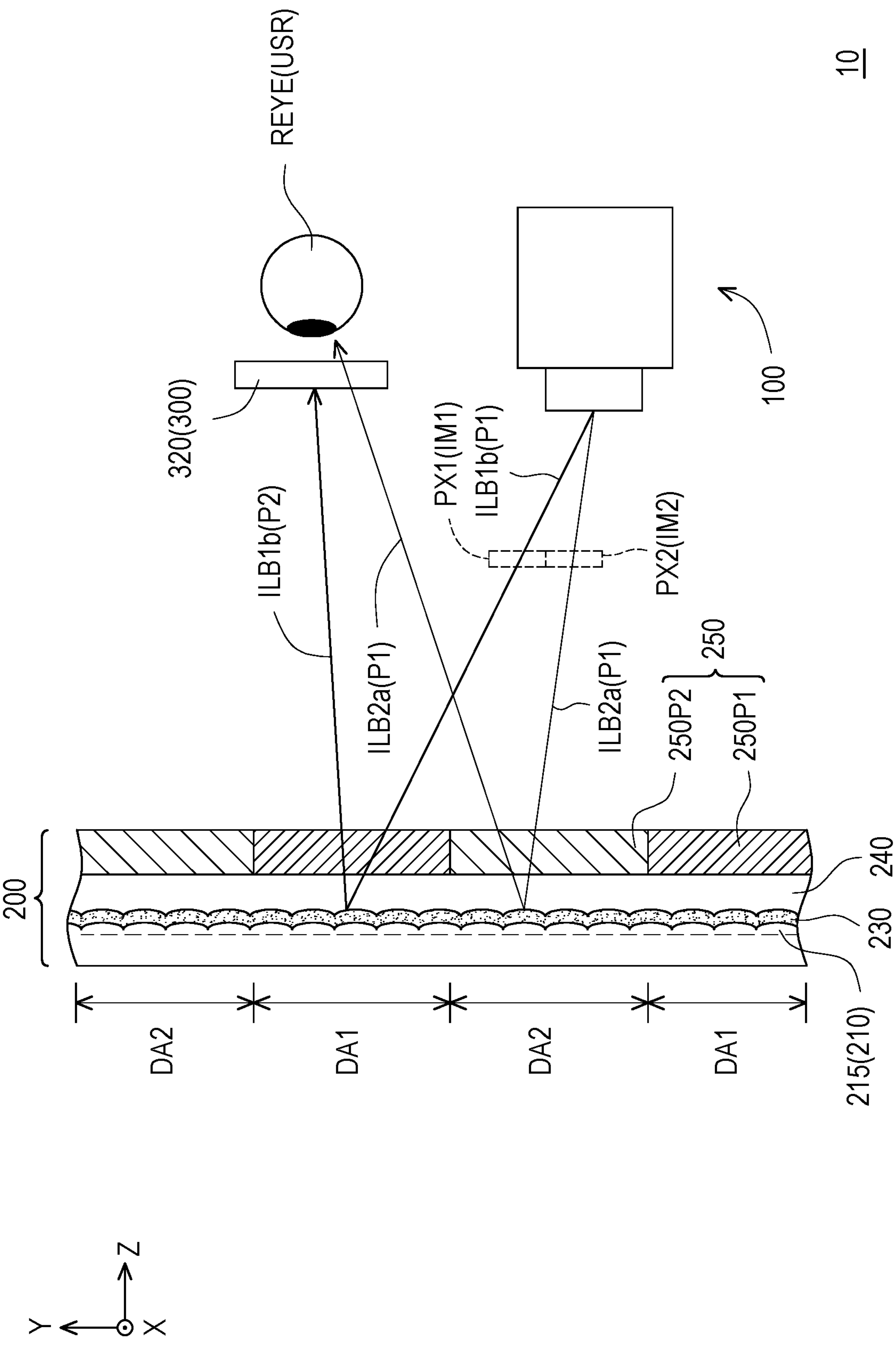

FIG. 1 is a schematic diagram of a stereo projection system according to a first embodiment of the disclosure. FIG. 2A and FIG. 2B are schematic top views of the stereo projection system shown in FIG. 1. FIG. 3A and FIG. 3B are schematic side views of the stereo projection system shown in FIG. 1. Referring to FIG. 1 to FIG. 3B, a stereo projection system includes a polarized projector 100, a stereo projection screen 200, and polarizing glasses 300. The polarized projector 100 is adapted to project multiple image light beams having a first polarization state P1, such as a first image light beam ILB1*a*, a first image light beam ILB1*b*, a second image light beam ILB2*a*, and a second image light beam ILB2*b*.

The polarized projector 100 is, for example, a projector that uses a liquid crystal display (LCD) panel, a Liquid Crystal On Silicon (LCOS) panel, or a digital micro-mirror device (DMD) as a light valve, but is not limited thereto. In order to make the projected image light beam have a specific polarization state, the polarized projector 100 further has a polarizer (not shown). For example, when the stereo projection system 10 is to switch from a stereo display (3D) mode to a 2D display (2D) mode, the polarizer may be detached from the polarized projector 100, but is not limited thereto.

The stereo projection screen 200 is disposed on the transmission path of the image light beams, and has multiple first display areas DA1 and multiple second display areas DA2. In the embodiment, the first display areas DA1 and the second display areas DA2 have the same length along a direction X (e.g., equal to the length of the display area of the stereo projection screen 200), and the first display areas DA1 and the second display areas DA2 may be arranged alternately along a direction Y (i.e., the first direction) optionally, and the direction Y is, for example, a direction perpendicular to the alignment direction of a left eye LEYE and a right eye REYE of a user USR (e.g., the direction X, that is, the second direction), but is not limited thereto. Specifically, each of the first display areas DA1 and the second display areas DA2 is strip-shaped areas. In other embodiments, the first display areas DA1 and the second display areas DA2 may be arranged alternately along the direction X optionally.

In detail, the stereo projection screen 200 includes a scattering screen 210, a metal reflection layer 230, and a phase retardation layer 250 disposed overlappingly along a direction Z (the direction Z is, for example, perpendicular to the directions X and Y). The metal reflection layer 230 is disposed between the scattering screen 210 and the phase retardation layer 250. The phase retardation layer 250 is disposed between the scattering screen 210 and the polarized projector 100.

The scattering screen 210 includes a scattering structure layer 215, and the scattering structure layer 215 is disposed on the side of the scattering screen 210 facing the polarized projector 100 (as shown in FIG. 3A). In the embodiment, the scattering structure layer 215 is, for example, multiple scattering microstructures with the same or different sizes, but is not limited thereto. The metal reflection layer 230 covers the scattering structure layer 215 of the scattering screen 210 (e.g., the coverage is greater than 90%) and is adapted to reflect the image light beam from the phase retardation layer 250 back to the phase retardation layer 250. In the embodiment, the metal reflection layer 230 is disposed in both the first display area DA1 and the second display area DA2. The metal reflection layer 230 is, for example, a coating film or an adhesive layer formed of silver, aluminum, or the above-mentioned alloys.

In the embodiment, the phase retardation layer 250 may include multiple first patterns 250P1 and multiple second patterns 250P2. The first patterns 250P1 are respectively disposed in the multiple first display areas DA1. The second patterns 250P2 are respectively disposed in the multiple second display areas DA2. From another point of view, the aforementioned multiple first display areas DA1 are respectively defined by the multiple first patterns 250P1 of the phase retardation layer 250, and the aforementioned multiple second display areas DA2 are respectively defined by the multiple second patterns 250P2 of the phase retardation layer 250, but the disclosure is not limited thereto. That is to say, the first patterns 250P1 and the second patterns 250P2 are also arranged alternately along the direction Y.

For example, the first patterns 250P1 and the second patterns 250P2 may be arranged closely to each other, and the width of each pattern along the direction Y is roughly equal to the width of the image pixel of the image projected by the polarized projector 100 (a first pixel PX1 of a first image IM1 and a second pixel PX2 of a second image IM2 as shown in FIG. 3A) on the stereo projection screen 200.

In the embodiment, the phase retardation of the first pattern 250P1 of the phase retardation layer 250 is different from the phase retardation of the second pattern 250P2 of the phase retardation layer 250, so the polarization states of the two image light beams passing through the first pattern 250P1 and the second pattern 250P2 respectively are different. For example, the difference value between the phase retardation of the first pattern 250P1 and the phase retardation of the second pattern 250P2 is one-quarter or three-quarters of the wavelength of each of the first image light beam and the second image light beam. In the embodiment, the phase retardation of the first pattern 250P1 is, for example, one-quarter of the wavelength of the first image light beam, and the phase retardation of the second pattern 250P2 is, for example, 0 μm. However, the disclosure is not limited thereto. Since the phase retardation of the second pattern 250P2 is 0 μm, in another modified embodiment, no phase retardation pattern is disposed in the second display area DA2 (i.e., the second patterns 250P2 are the space between the first patterns 250P1).

It should be noted that the multiple image pixels of the image projected by the polarized projector 100 may have various display colors, such as red, green, or blue, but is not limited thereto. That is to say, the multiple image light beams from the polarized projector 100 may have different wavelength ranges. Therefore, the respective phase retardation of the multiple first patterns 250P1 (or the multiple second patterns 250P2) of the phase retardation layer 250 may be different from each other corresponding to the image light beams of different wavelengths. For example, the wavelength may be a dominant wavelength of a red light, a green light, or a blue light projected by the polarized projector 100.

On the other hand, the polarizing glasses 300 include a left-eye lens 310 and a right-eye lens 320 arranged along the direction X (i.e., the second direction). The left-eye lens 310 is adapted to allow the image light beam having the second polarization state to pass through, and the right-eye lens 320 is adapted to allow the image light beam having the first polarization state to pass through, and the first polarization state is orthogonal to the second polarization state.

In the embodiment, the polarized projector 100 synchronously (simultaneously) projects the first image IM1 and the second image IM2. In the direction Y, the multiple first pixels PX1 of the first image IM1 and the multiple second pixels PX2 of the second image IM2 are arranged alternately (as shown in FIG. 3A). The first image IM1 may be formed by the multiple first image light beams, and the second image IM2 may be formed by the multiple second image light beams. In order to allow the user USR to have the stereo vision, the first image IM1 and the second image IM2 are two images with parallax.

Specifically, the image light beam being transmitted to the left-eye lens 310 is described, please refer to FIG. 2A, FIG. 2B and FIG. 3A. The first image light beam ILB1*a* projected by the polarized projector 100 is transmitted to the first display area DA1 and the left-eye lens 310 in sequence, and the second image light beam ILB2*b* is transmitted to the second display area DA2 and the left-eye lens 310 in sequence. In the embodiment, the first image light beam ILB1*a* (the first image IM1) having the first polarization state P1 (e.g., the first linear polarization) is transformed into the first image light beam ILB1*a* having a second polarization state P2 (e.g., the second linear polarization) after being transmitted to the first display area DA1 and leaving the stereo projection screen 200. For example, after passing through the first pattern 250P1 of the phase retardation layer 250, the first polarization state P1 of the first image light beam ILB1*a* from the polarized projector 100 is transformed into a first circular polarization state. After being reflected by the metal reflection layer 230 and passing through the first pattern 250P1 again, the first circular polarization state of the first image light beam ILB1*a* from the phase retardation layer 250 is transformed into the second polarization state P2.

It should be noted that, since the left-eye lens 310 of the embodiment is adapted to allow the first image light beam ILB1*a* having the second polarization state P2 to pass through, the left eye LEYE of the user USR may receive the first image light beam ILB1*a* (the first image IM1) by the left-eye lens 310.

On the other hand, the second image light beam ILB2*b* (the second image IM2) having the first polarization state P1 still has the first polarization state after being transmitted to the second display area DA2 and leaving the stereo projection screen 200. For example, since the phase retardation of the second pattern 250P2 in the second display area DA2 is 0 μm, the polarization state of the second image light beam ILB2*b* from the polarized projector 100 does not change after passing through the second pattern 250P2. In addition, the polarization state of the second image light beam ILB2*b* does not change after being reflected by the metal reflection layer 230.

Since the left-eye lens 310 of the embodiment is also adapted to absorb the second image light beam ILB2*b* having the first polarization state P1, the left eye LEYE of the user USR may not receive the second image light beam ILB2*b* (the second image IM2) by the left-eye lens 310.

Next, the image light beam being transmitted to the right-eye lens 320 is described. Referring to FIG. 2A, FIG.

2B, and FIG. 3B, the first image light beam ILB1*b* projected by the polarized projector 100 is transmitted to the first display area DA1 and the right-eye lens 320 in sequence, and the second image light beam ILB2*a* is transmitted to the second display area DA2 and the right-eye lens 320 in sequence. In the embodiment, the second image light beam ILB2*a* (the second image IM2) having the first polarization state P1 (e.g., the first linear polarization) still has the first polarization state P1 after being transmitted to the second display area DA2 and leaving the stereo projection screen 200. For example, the polarization state of the second image light beam ILB2*a* from the polarized projector 100 does not change after passing through the second pattern 250P2 of the phase retardation layer 250. The polarization state of the second image light beam ILB2*a* from the phase retardation layer 250 does not change after being reflected by the metal reflection layer 230.

Since the right-eye lens 320 of the embodiment is adapted to allow the second image light beam ILB2*a* having the first polarization state P1 to pass through, the right eye REYE of the user USR may receive the second image light beam ILB2*a* (the second image IM2).

On the other hand, the first image light beam ILB1*b* (the first image IM1) having the first polarization state P1 (e.g., the first linear polarization) is transformed into the first image light beam ILB1*b* having the second polarization state P2 (e.g., the second linear polarization) after being transmitted to the first display area DA1 and leaving the stereo projection screen 200. For example, after passing through the first pattern 250P1 of the phase retardation layer 250, the first polarization state P1 of the first image light beam ILB1*b* from the polarized projector 100 is transformed into the first circular polarization state. After being reflected by the metal reflection layer 230 and passing through the first pattern 250P1 again, the first circular polarization state of the first image light beam ILB1*b* from the phase retardation layer 250 is transformed into the second polarization state P2.

Since the right-eye lens 320 of the embodiment is also adapted to absorb the first image light beam ILB1*b* having the second polarization state P2, the right eye REYE of the user USR may not receive the first image light beam ILB1*b* (the first image IM1) by the right-eye lens 320.

Through the above operating principle, the polarization state of the image light beam projected by the polarized projector 100 does not need to be synchronized with the image signals, and the user USR may still generate the stereo vision. That is to say, the stereo projection system of the embodiment may avoid the signal crosstalk problem caused by the current synchronization technology, thereby helping to enhance the stereo viewing experience of the user. In addition, since the polarized projector 100 of the embodiment does not require an external polarizing modulator to dynamically adjust the polarization state of the projected image light beam for synchronizing the image signal, the operational convenience of the stereo projection system may be significantly increased.

Furthermore, in order to dispose the phase retardation layer 250 and the metal reflection layer 230, the stereo projection screen 200 may also optionally include an optical adhesive layer 240. the optical adhesive layer 240 is, for example, disposed between the phase retardation layer and the metal reflection layer 230. The material of the optical adhesive layer 240 is, for example, an optical clear adhesive (OCA), a hardened optical clear resin (OCR), or an optical pressure sensitive adhesive (PSA). However, the disclosure is not limited thereto. In another embodiment not shown, an air gap may also be used between the phase retardation layer 250 and the metal reflection layer 230 instead of the optical adhesive layer 240. That is to say, the stereo projection screen may also use the spacer structure to form an air gap between the phase retardation layer 250 and the metal reflection layer 230.

Some other embodiments are listed below to describe the disclosure in detail, in which the same components are marked with the same symbols, and the description of the same technical content are omitted and may be referenced to the foregoing embodiments.

Figure 4:
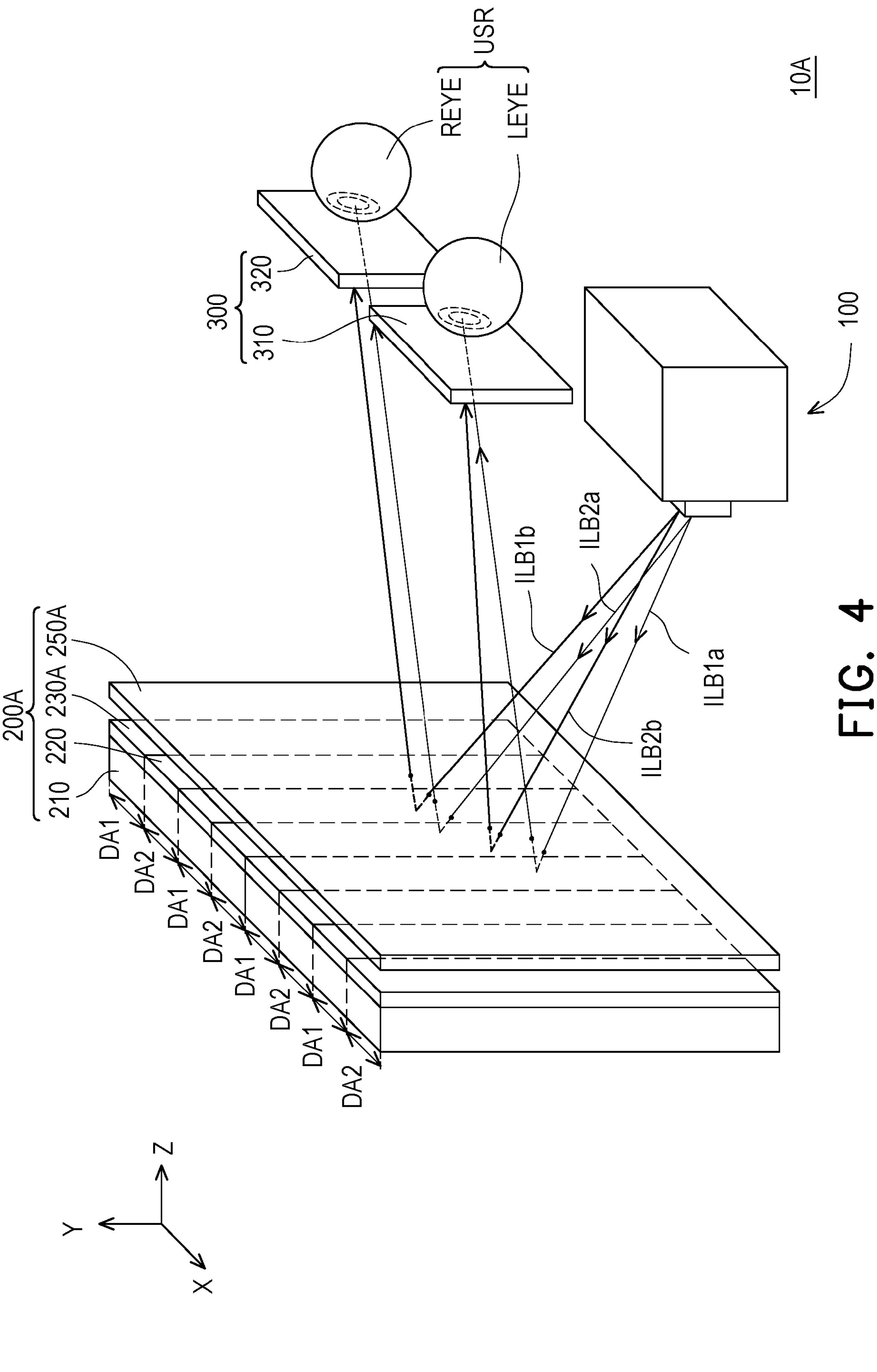
FIG. 4 is a schematic diagram of a stereo projection system according to a second embodiment of the disclosure.
Figure 5A:
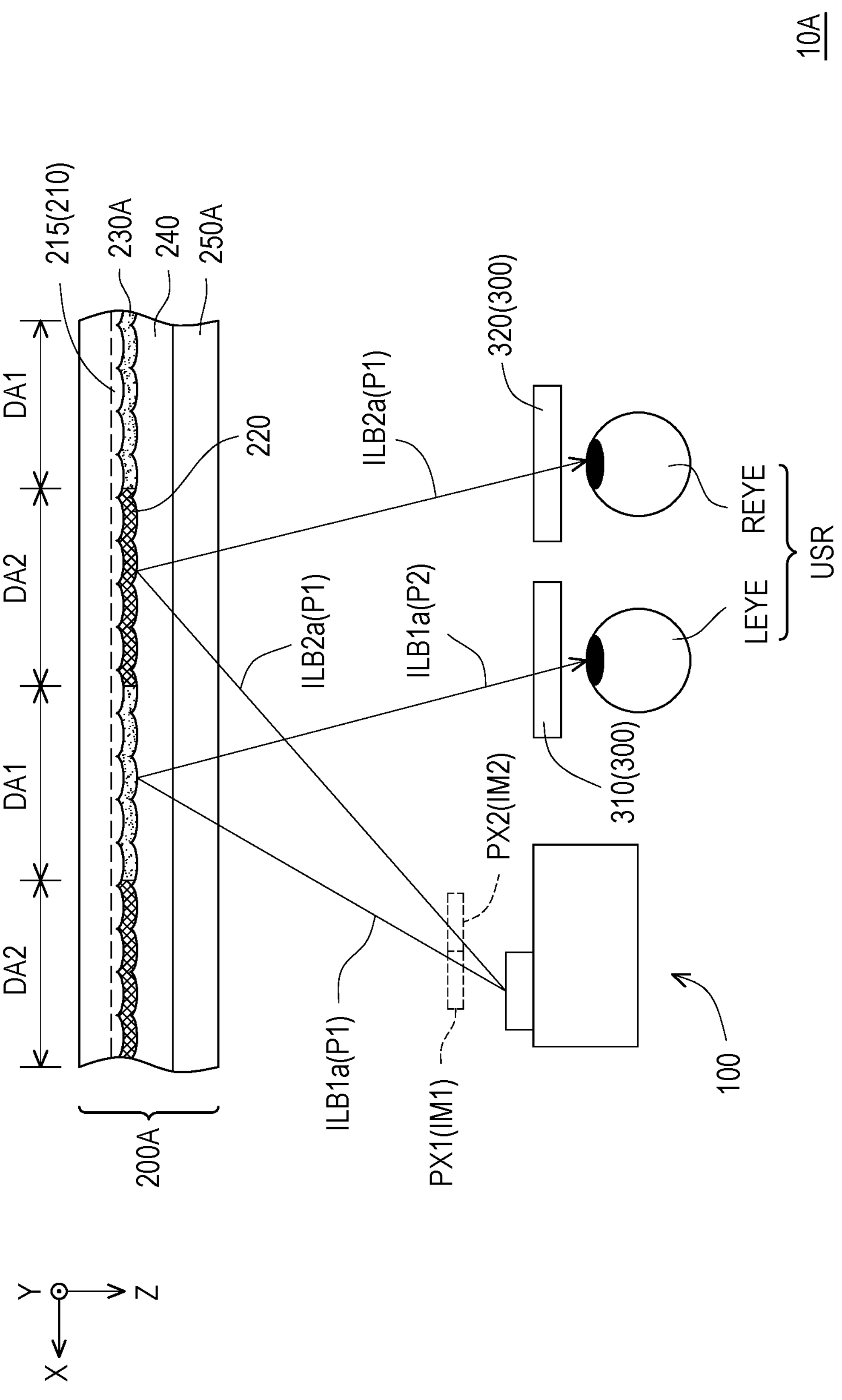
FIG. 5A and FIG. 5B are schematic top views of the stereo projection system shown in FIG. 4.
Figure 5B:
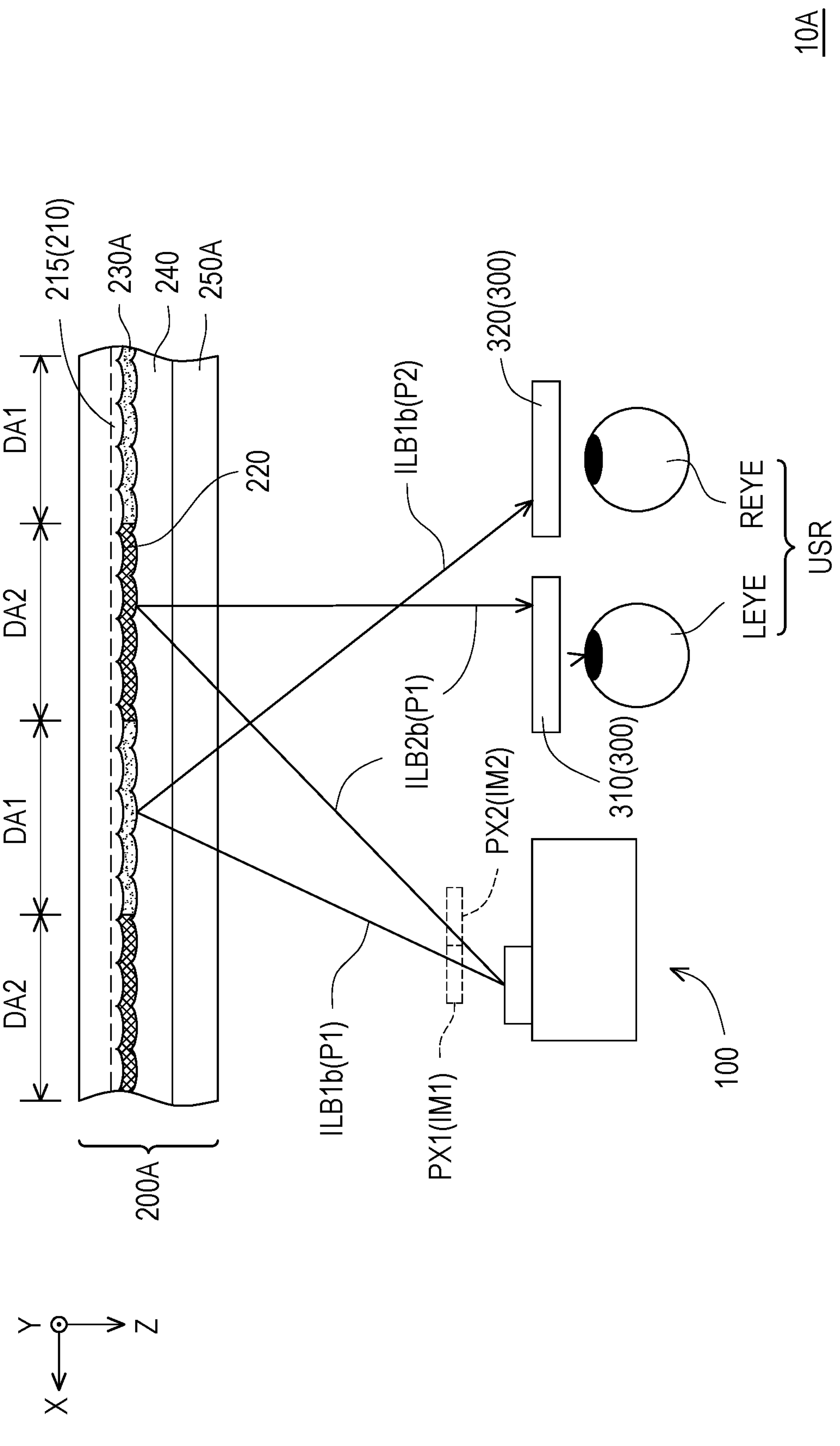

FIG. 4 is a schematic diagram of a stereo projection system according to a second embodiment of the disclosure. FIG. 5A and FIG. 5B are schematic top views of the stereo projection system shown in FIG. 4. Referring to FIG. 4, FIG. 5A, and FIG. 5B, the difference between a stereo projection system 10A of the embodiment and the stereo projection system 10 of FIG. 1 lies in the configuration of the stereo projection screen.

Specifically, in the embodiment, the first display areas DA1 and the second display areas DA2 are arranged alternately along the direction X, and a stereo projection screen 200A may also include a cholesteric liquid crystal layer 220, which is disposed between the scattering screen 210 and a phase retardation layer 250A. For example, in the embodiment, a metal reflection layer 230A may be divided into multiple metal reflection patterns, and the cholesteric liquid crystal layer 220 may be divided into multiple cholesteric liquid crystal patterns. The metal reflection patterns and the cholesteric liquid crystal patterns may be arranged alternately along the direction X and extend in the direction Y. In other embodiments, the metal reflection patterns and the cholesteric liquid crystal patterns may be arranged alternately along the direction Y, and extend in the direction X.

It should be noted that in the embodiment, the multiple first display areas DA1 and the multiple second display areas DA2 of the stereo projection screen 200A are respectively defined by the aforementioned metal reflection patterns and the multiple cholesteric liquid crystal patterns. That is to say, the metal reflection layer 230A is only disposed in the multiple first display areas DA1 (that is, the metal reflection layer 230A does not overlap the multiple second display areas DA2), and the cholesteric liquid crystal layer 220 is only disposed in the multiple second display areas DA2 (that is, the cholesteric liquid crystal layer 220 does not overlap the multiple first display areas DA1).

The cholesteric liquid crystal layer 220 is, for example, formed of multiple liquid crystal molecules (not shown) twisted and arranged with a specific pitch, and the image light beam with a specific wavelength is reflected by the cholesteric liquid crystal layer 220, and the specific wavelength is roughly equal to the product value of the arrangement pitch (i.e., the specific pitch) of the cholesteric liquid crystal layer 220 and the average refractive index. That is to say, the image light beam with the specific wavelength that may be reflected by the cholesteric liquid crystal layer 220 may be changed by adjusting the arrangement pitch thereof and/or the average refractive index.

On the other hand, unlike the phase retardation layer 250 of FIG. 1, the phase retardation of the phase retardation layer 250A in the first display area DA1 of the embodiment is equal to the phase retardation of the phase retardation layer 250A in the second display area DA2. For example, in the embodiment, the phase retardation of the phase retardation layer 250A in the display areas is one-quarter of the wavelength of each of the first image light beam and the second image light beam, and the cholesteric liquid crystal layer 220 is adapted to reflect the image light beam having the first circular polarization state, but is not limited thereto. In another modified embodiment, the phase retardation of the phase retardation layer 250A in the display areas is three-quarters of the wavelength of each of the first image light beam and the second image light beam, and the cholesteric liquid crystal layer 220 is adapted to reflect the image light beam having the second circular polarization state. It should be noted that, when the phase retardation is three-quarters of the wavelength, the polarization states of the light beams that may pass through the left-eye lens and the right-eye lens of the polarizing glasses are respectively the first polarization state P1 and the second polarization state P2, but the left and right eyes may still see the correct image by changing the content of the image (for example, swapping the left-eye image with the right-eye image).

Referring to FIG. 5A, in the embodiment, the first image light beam ILB1*a* (the first image IM1) having the first polarization state P1 (e.g., the first linear polarization) is transformed into the first image light beam ILB1*a* having the second polarization state P2 (e.g., the second linear polarization) after being transmitted to the first display area DA1 and leaving the stereo projection screen 200A. For example, after passing through the phase retardation layer 250A, the first polarization state P1 of the first image light beam ILB1*a* from the polarized projector 100 is transformed into the first circular polarization state. Then, after being reflected by the metal reflection layer 230A and passing through the phase retardation layer 250A again, the first circular polarization state of the first image light beam ILB1*a* is transformed into the second polarization state P2.

Since the left-eye lens 310 of the embodiment is adapted to allow the first image light beam ILB1*a* having the second polarization state P2 to pass through, the left eye LEYE of the user USR may receive the first image light beam ILB1*a* (the first image IM1) by the left-eye lens 310.

On the other hand, the second image light beam ILB2*a* (the second image IM2) having the first polarization state P1 still has the first polarization state after being transmitted to the second display area DA2 and leaving the stereo projection screen 200A. For example, after passing through the phase retardation layer 250A, the first polarization state P1 of the second image light beam ILB2*a* from the polarized projector 100 is transformed into the first circular polarization state.

It should be noted that, since the cholesteric liquid crystal layer 220 located in the second display area DA2 is adapted to reflect the second image light beam ILB2*a* having the first circular polarization state, and the reflected second image light beam ILB2*a* is still maintained in the first circular polarization state, after being reflected by the cholesteric liquid crystal layer 220 and passing through the phase retardation layer 250A again, the polarization state of the second image light beam ILB2*a* is transformed into the first polarization state P1.

Since the right-eye lens 320 of the embodiment is adapted to allow the second image light beam ILB2*a* having the first polarization state P1 to pass through, the right eye REYE of the user USR may receive the second image light beam ILB2*a* (the second image IM2) by the right-eye lens 320.

Please refer to FIG. 5B, the first image light beam ILB1*b* (the first image IM1) having the first polarization state P1 (e.g., the first linear polarization) is transformed into the first image light beam ILB1*b* having the second polarization state P2 (e.g., the second linear polarization) after being transmitted to the first display area DA1 and leaving the stereo projection screen 200A. For example, after passing through the phase retardation layer 250A, the first polarization state P1 of the first image light beam ILB1*b* from the polarized projector 100 is transformed into the first circular polarization state. Then, after being reflected by the metal reflection layer 230A and passing through the phase retardation layer 250A again, the first circular polarization state of the first image light beam ILB1*b* is transformed into the second polarization state P2.

Since the right-eye lens 320 of the embodiment is also adapted to absorb the first image light beam ILB1*b* having the second polarization state P2, the right eye REYE of the user USR may not receive the first image light beam ILB1*b* (the first image IM1) by the right-eye lens 320.

On the other hand, the second image light beam ILB2*b* (the second image IM2) having the first polarization state P1 still has the first polarization state P1 after being transmitted to the second display area DA2 and leaving the stereo projection screen 200A. For example, after passing through the phase retardation layer 250A, the first polarization state P1 of the second image light beam ILB2*b* from the polarized projector 100 is transformed into the first circular polarization state. Then, after being reflected by the cholesteric liquid crystal layer 220 and passing through the phase retardation layer 250A again, the polarization state of the second image light beam ILB2*b* is transformed into the first polarization state P1.

Since the left-eye lens 310 of the embodiment is also adapted to absorb the second image light beam ILB2*b* having the first polarization state P1, the left eye LEYE of the user USR may not receive the second image light beam ILB2*b* (the second image IM2) by the left-eye lens 310.

Through the above operating principle, the first image light beam (the first image IM1) is only received by the left eye LEYE, and the second image light beam (the second image IM2) is only received by the right eye REYE. Therefore, the signal crosstalk problem caused by the current synchronization technology may be avoided (that is, the left eye LEYE sees the second image IM2, and the right eye REYE sees the first image IM1). In other words, the stereo projection system 10A of the embodiment may enhance the stereo viewing experience of the user USR.

Figure 6:
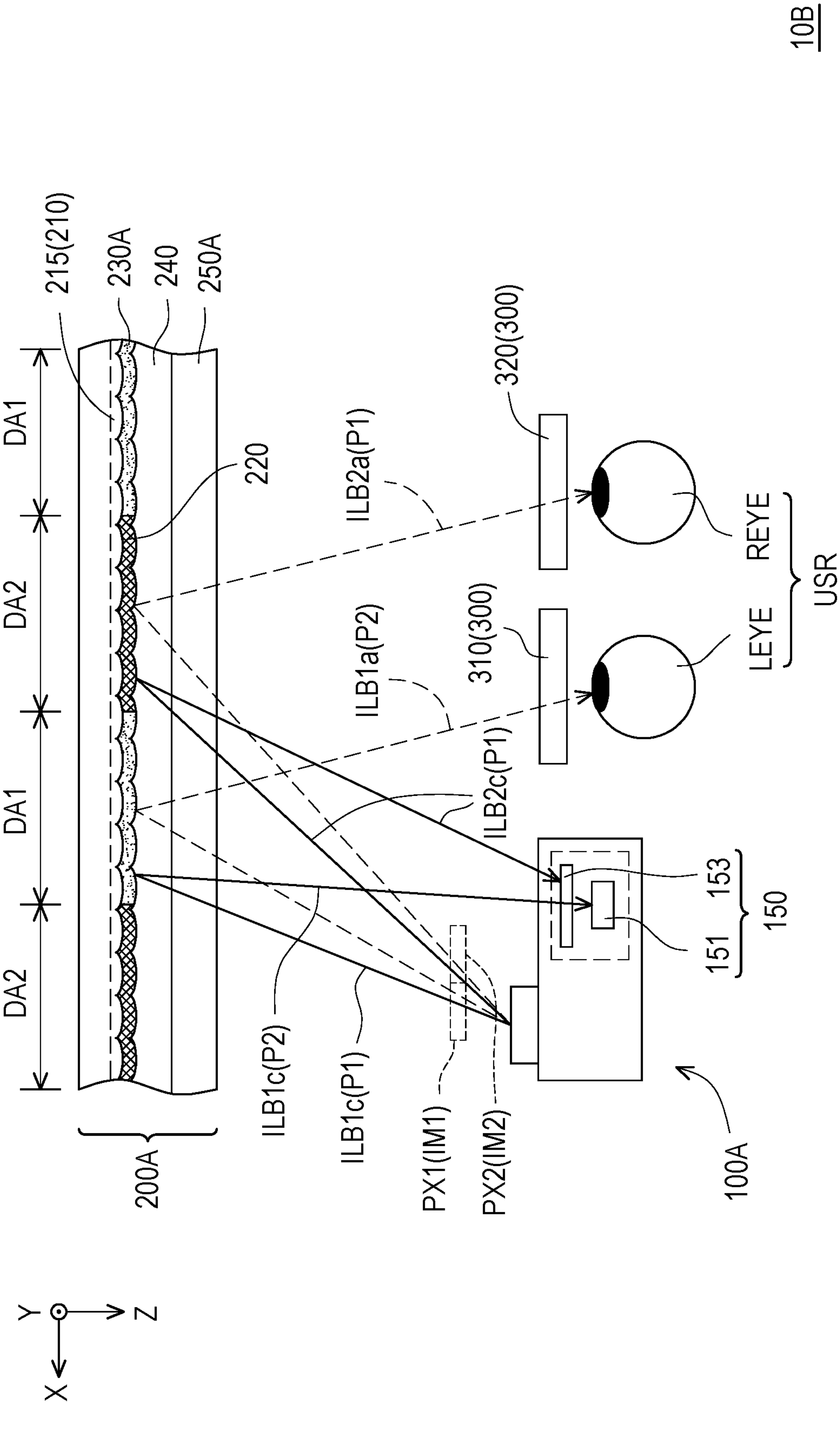
FIG. 6 is a schematic top view of the stereo projection system of FIG. 5A according to another modified embodiment.

FIG. 6 is a schematic top view of the stereo projection system of FIG. 5A according to another modified embodiment. Referring to FIG. 6, the difference between a stereo projection system 10B of the embodiment and the stereo projection system 10A of FIG. 5A is that a polarized projector 100A of the stereo projection system 10B of the embodiment further has an aligner 150. The aligner 150 is configured to provide alignment information, and the polarized projector 100A projects the multiple first pixels PX1 constituting the first image IM1 to the multiple display areas DA1 of the stereo projection screen 200A and projects the multiple second pixels PX2 constituting the second image IM2 to the multiple second display areas DA2 of the stereo projection screen 200A according to the alignment information.

More specifically, through the operation of the aligner 150, the polarized projector 100A may perform self-calibration, so that the first image IM1 may be accurately projected within the multiple first display areas DA1, and the second image IM2 may be accurately projected within the multiple second display areas DA2.

In the embodiment, the aligner 150 is, for example, an optical aligner, and may include an image sensor 151 and a polarizer 153. The image sensor 151 is used for receiving a first image light beam ILB1*c* or a second image light beam ILB2*c* from the stereo projection screen 200A. The polarizer 153 is disposed between the image sensor 151 and the stereo projection screen 200A. The polarizer 153 is adapted to allow one of the first image light beam ILB1*c* and the second image light beam ILB2*c* from the stereo projection screen 200A to pass through and absorb the other of the first image light beam ILB1*c* and the second image light beam ILB2*c* from the stereo projection screen 200A. For example, the polarizer 153 of the embodiment is adapted to allow the first image light beam ILB1*c* having the second polarization state P2 to pass through and absorb the second image light beam ILB2*c* having the first polarization state P1, but is not limited thereto.

It should be noted that, during the calibration process of the image projection performed by the stereo projection system 10B using the aligner 150, the first image IM1 and the second image IM2 projected by the polarized projector 100A are, for example, a white image and a black image, respectively. When the second pixel PX2 constituting the second image IM2 is projected on the stereo projection screen 200A and partially overlaps the first display area DA1, the calibrated image received by the image sensor 151 presents multiple black areas and multiple white areas arranged alternately along the direction X.

The stereo projection system 10B may adjust the projection angle of the image light beam of the polarized projector 100A according to the distribution ratio of the black areas and the white areas in the calibrated image until the calibrated image (e.g., whole image of the stereo projection screen 200A) received by the image sensor 151 is a complete white picture. It should be noted that the images used for calibration are not limited to the white images or the black images, and may be other easily identifiable images.

Figure 7B:
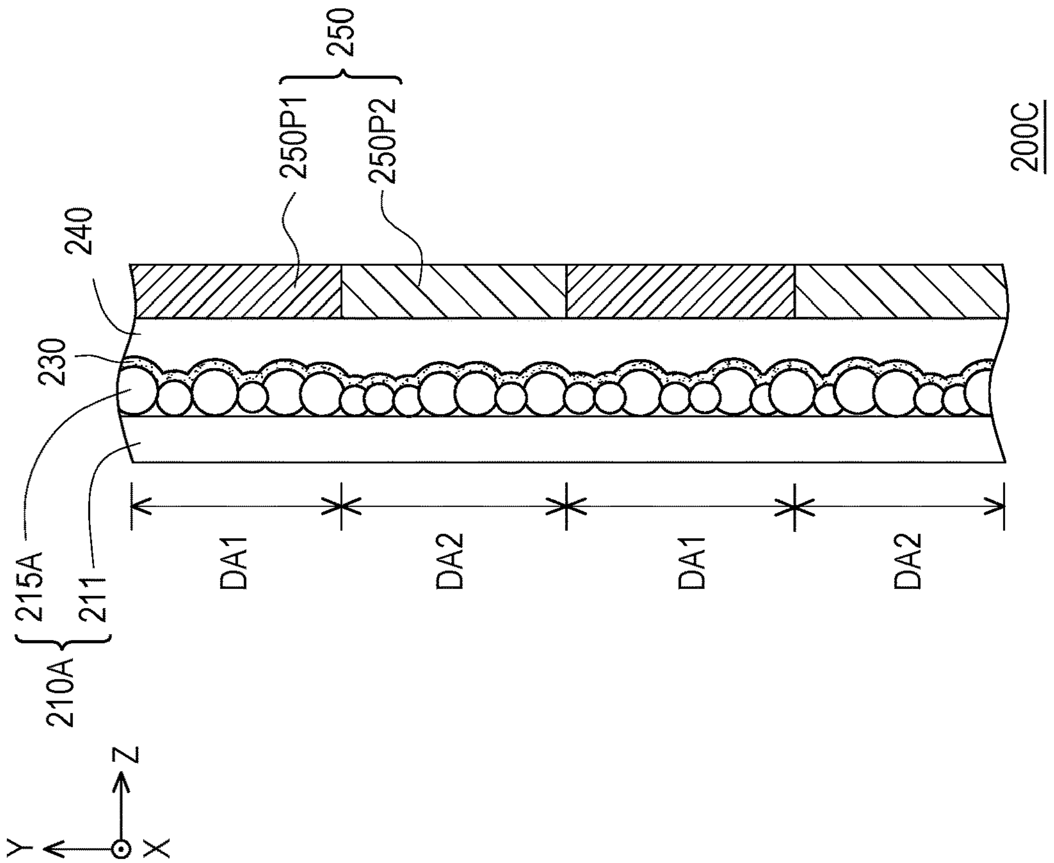
FIG. 7A to FIG. 7D are schematic side views of the stereo projection screen of FIG. 3A according to other modified embodiments.
Figure 7A:
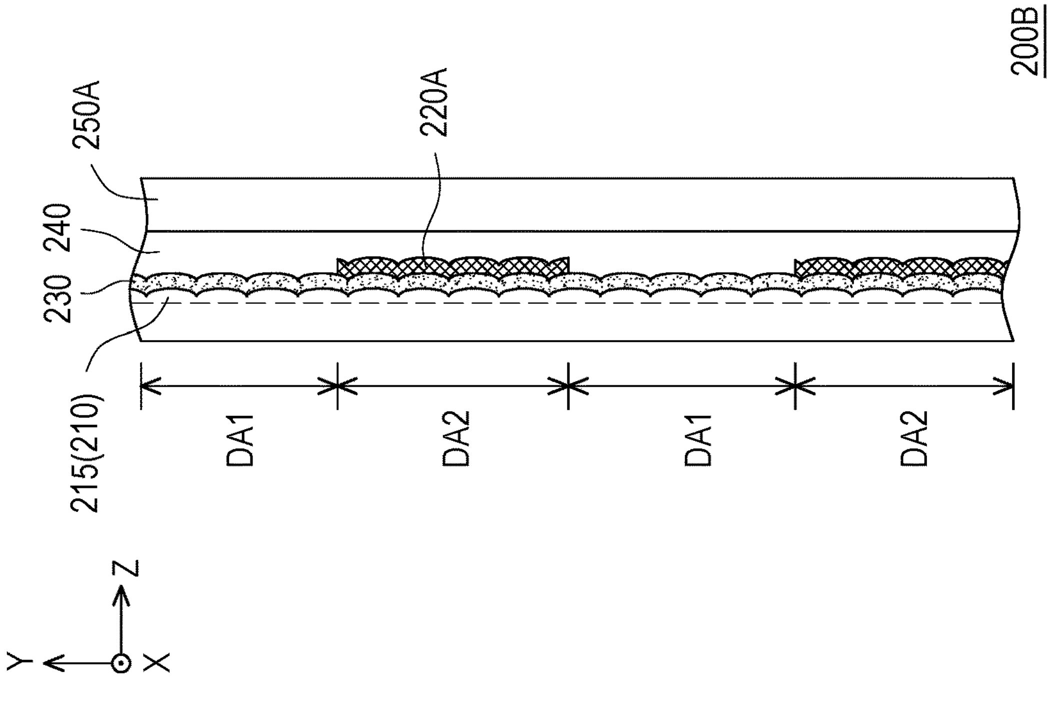
Figure 7C:
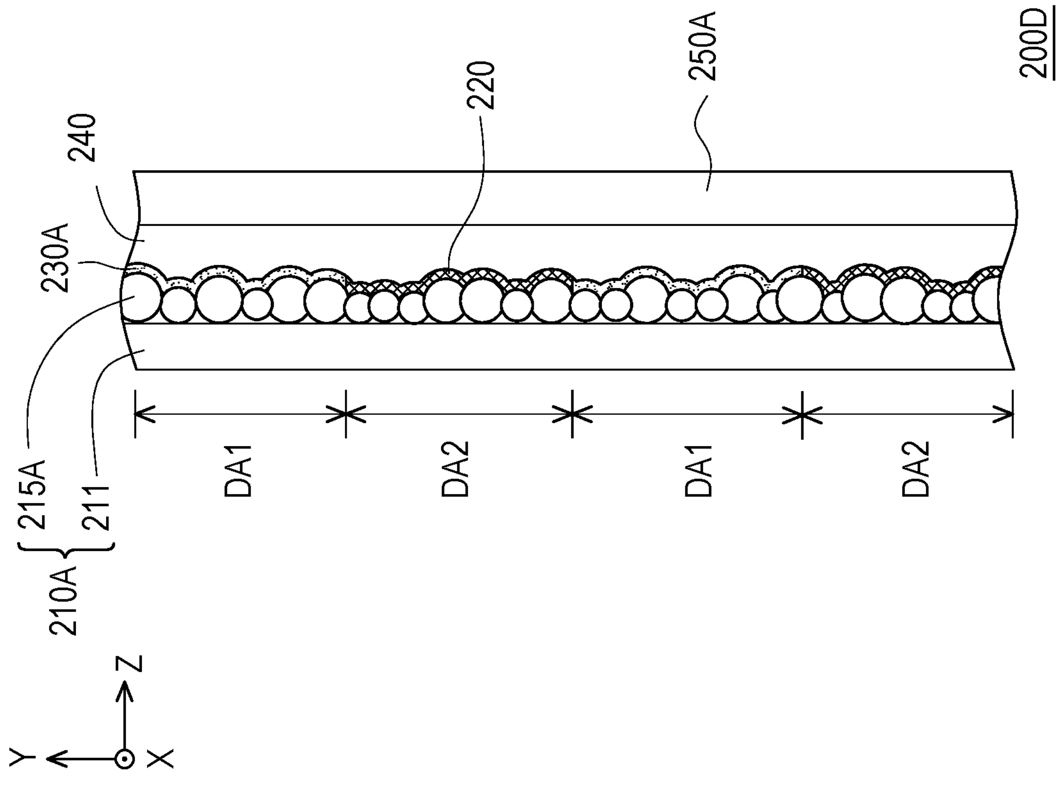

FIG. 7A to FIG. 7D are schematic side views of the stereo projection screen of FIG. 3A according to other modified embodiments. Referring to FIG. 7A, unlike the stereo projection screen 200A of FIG. 5A, the metal reflection layer 230 of a stereo projection screen 200B in the embodiment is disposed on the entire surface of the scattering screen 210, meaning that the second display area DA2 of the stereo projection screen 200B further has the metal reflection layer 230, in addition to a cholesteric liquid crystal layer 220A, and the metal reflection layer 230 located in the second display area DA2 is disposed between the scattering screen 210 and the cholesteric liquid crystal layer 220A. That is to say, the metal reflection layer 230 extends between the cholesteric liquid crystal layer 220A and the scattering screen 210 in addition to being disposed in the multiple first display areas DAL Referring to FIG. 7B, unlike the stereo projection screen 200 of FIG. 3A, a scattering structure layer 215A of a scattering screen 210A of a stereo projection screen 200C of the embodiment replaces the scattering microstructures in the scattering structure layer 215 of FIG. 3A with multiple scattering particles, and the scattering particles may have different particle sizes and are dispersedly disposed on a substrate 211.

Figure 7D:
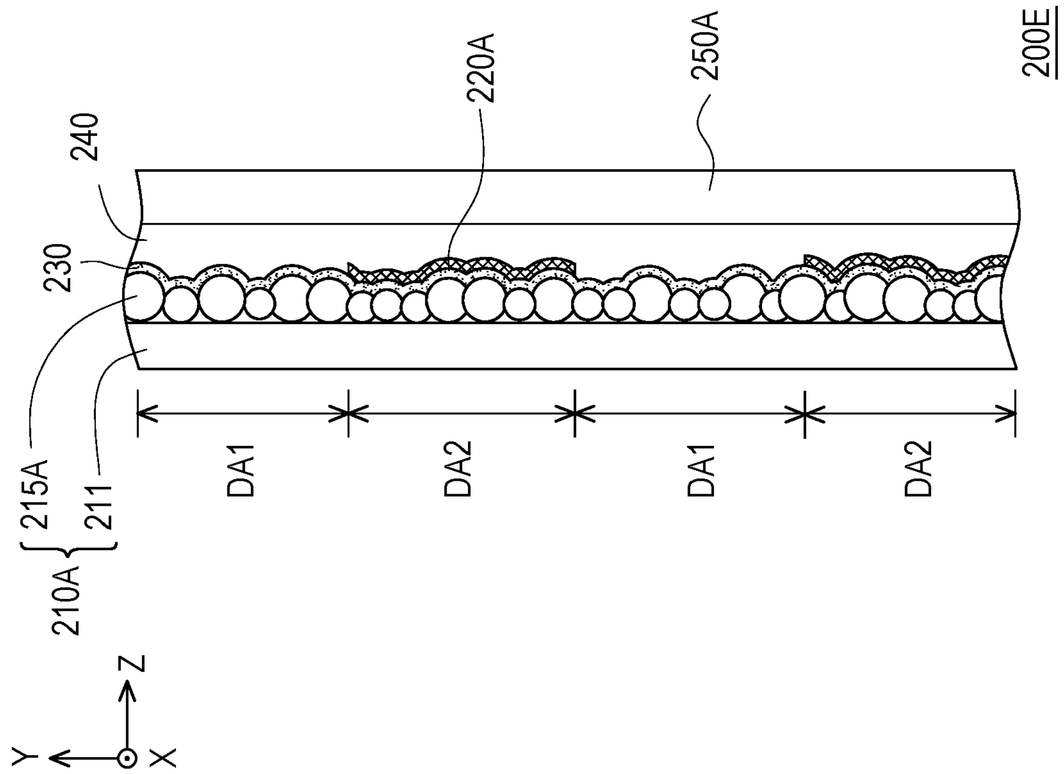

Similarly, the scattering structure layer 215A formed of the multiple scattering particles of FIG. 7B may also be used to replace the scattering microstructures in the scattering structure layer 215 of FIG. 5A (as shown in a stereo projection screen 200D of FIG. 7C), or replace the scattering microstructures in the scattering structure layer 215 of FIG. 7A (as shown in a stereo projection screen 200E of FIG. 7D).

Since the operating principle of any of the stereo projection screens of FIG. 7A to FIG. 7D is similar to the stereo projection screen 200 of FIG. 3A or the stereo projection screen 200A of FIG. 5A, please refer to the relevant paragraphs of the foregoing embodiments and the details are not repeated here.

To sum up, in the stereo projection system according to an embodiment of the disclosure, the stereo projection screen has the scattering screen and the phase retardation layer, and at least part of the display area has a metal reflection layer. Through the configuration relationship between the metal reflection layer and the phase retardation layer, the polarization state of the first image light beam projected to a part of the display area changes after leaving the stereo projection screen and may only pass through one of the lenses of the polarizing glasses, while the polarization state of the second image light beam projected to the rest of the display area remains unchanged after leaving the stereo projection screen and may only pass through the other of the lenses of the polarizing glasses. Accordingly, when the polarization state of the image light beam projected by the polarized projector does not need to be synchronized with the image signals of the two eyes, the user may still generate the stereo vision and avoid the signal crosstalk problem caused by the current synchronization technology. In addition, during the operation of the stereo projection system, since the polarized projector does not require an external polarizing modulator to dynamically adjust the polarization state of the projected image light beam, the operational convenience of the stereo projection system may be increased.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A stereo projection system, comprising:

a polarized projector, adapted to project a first image light beam having a first polarization state and a second image light beam having the first polarization state;

a stereo projection screen, disposed on a transmission path of the first image light beam and the second image light beam, and having a first display area and a second display area, wherein the stereo projection screen comprises:

a scattering screen, wherein a scattering structure layer is disposed on a side of the scattering screen facing the polarized projector;

a phase retardation layer, disposed between the scattering screen and the polarized projector; and a metal reflection layer, covering at least a part of the scattering structure layer, and adapted to reflect the first image light beam from the phase retardation layer back to the phase retardation layer, wherein the first image light beam has a second polarization state after being transmitted to the first display area and leaving the stereo projection screen, the second image light beam still has the first polarization state after being transmitted to the second display area and leaving the stereo projection screen, and the second polarization state is orthogonal to the first polarization state; and a pair of polarizing glasses, having a left-eye lens and a right-eye lens, wherein one of the left-eye lens and the right-eye lens is adapted to allow the first image light beam having the second polarization state to pass through and absorb the second image light beam having the first polarization state, and the other of the left-eye lens and the right-eye lens is adapted to allow the second image light beam having the first polarization state to pass through and absorb the first image light beam having the second polarization state.

2. The stereo projection system according to claim 1, wherein the phase retardation layer comprises a first pattern and a second pattern, the first pattern and the second pattern are respectively located in the first display area and the second display area, and a difference value between a phase retardation of the first pattern and a phase retardation of the second pattern is one-quarter or three-quarters of a wavelength of each of the first image light beam and the second image light beam.

3. The stereo projection system according to claim 1, wherein the phase retardation layer comprises a first pattern and a second pattern, the first pattern and the second pattern are respectively located in the first display area and the second display area, and a phase retardation of the first pattern is one-quarter or three-quarters of a wavelength of the first image light beam, and a phase retardation of the second pattern is 0 μm.

4. The stereo projection system according to claim 1, wherein the stereo projection screen further comprises:

a cholesteric liquid crystal layer, disposed between the scattering screen and the phase retardation layer, and located in the second display area.

5. The stereo projection system according to claim 4, wherein a phase retardation of the phase retardation layer in the first display area is equal to a phase retardation of the phase retardation layer in the second display area, and the phase retardation is one-quarter or three-quarters of a wavelength of each of the first image light beam and the second image light beam.

6. The stereo projection system according to claim 4, wherein the metal reflection layer is located in the first display area and does not overlap the second display area.

7. The stereo projection system according to claim 4, wherein the metal reflection layer is arranged in the first display area and the second display area, and the metal reflection layer is located between the cholesteric liquid crystal layer and the scattering screen.

8. The stereo projection system according to claim 1, wherein the stereo projection screen has a plurality of first display areas and a plurality of second display areas, the first display areas and the second display areas are arranged alternately along a first direction, and the left-eye lens and the right-eye lens of the pair of polarizing glasses are arranged along a second direction, and the first direction is perpendicular to the second direction.

9. The stereo projection system according to claim 8, wherein the polarized projector synchronously projects a first image and a second image, a plurality of first pixels of the first image and a plurality of second pixels of the second image are arranged alternately along the first direction, a plurality of first image light beams constitute the first image, a plurality of second image light beams constitute the second image, and the first image and the second image are two images with parallax.

10. The stereo projection system according to claim 9, wherein the polarized projector further has an aligner, the aligner is configured to provide alignment information, and the polarized projector projects the first pixels to the first display areas of the stereo projection screen and projects the second pixels to the second display areas of the stereo projection screen according to the alignment information.

11. The stereo projection system according to claim 10, wherein the aligner comprises:

an image sensor, configured to receive the first image light beam or the second image light beam from the stereo projection screen; and a polarizer, disposed between the image sensor and the stereo projection screen, wherein the polarizer is adapted to allow one of the first image light beam and the second image light beam from the stereo projection screen to pass through and absorb the other of the first image light beam and the second image light beam from the stereo projection screen.

12. A stereo projection screen having a first display area and a second display area, wherein the stereo projection screen comprises:

a scattering screen, wherein a scattering structure layer is disposed on a side of the scattering screen facing a polarized projector;

a phase retardation layer, disposed on the scattering screen; and a metal reflection layer, covering at least a part of the scattering structure layer, wherein the metal reflection layer is disposed between the scattering screen and the phase retardation layer, the scattering structure layer is arranged in the first display area and the second display area, the metal reflection layer is arranged in at least one of the first display area and the second display area, a first image light beam having a first polarization state has a second polarization state after being transmitted to the first display area and leaving the stereo projection screen, a second image light beam having the first polarization state still has the first polarization state after being transmitted to the second display area and leaving the stereo projection screen, and the second polarization state is orthogonal to the first polarization state.

13. The stereo projection screen according to claim 12, wherein the metal reflection layer is arranged in the first display area and the second display area, the phase retardation layer comprises a first pattern and a second pattern, the first pattern and the second pattern are respectively located in the first display area and the second display area, and a phase retardation of the first pattern is one-quarter or three-quarters of a wavelength of the first image light beam, and a phase retardation of the second pattern is 0 μm.

14. The stereo projection screen according to claim 12, wherein further comprises:

a cholesteric liquid crystal layer, disposed between the scattering screen and the phase retardation layer, and located in the second display area, wherein the metal reflection layer is located in the first display area, and a phase retardation of the phase retardation layer in the first display area is equal to a phase retardation of the phase retardation layer in the second display area.

15. The stereo projection screen according to claim 14, wherein the metal reflection layer is arranged in the first display area and the second display area, and the metal reflection layer is located between the cholesteric liquid crystal layer and the scattering screen.

* * * * *